No. 661,427. Patented Nov. 6, 1900.
J. T. SIBLEY & R. T. NEWTON.
SLED.
(Application filed Mar. 17, 1900.)
(No Model.)
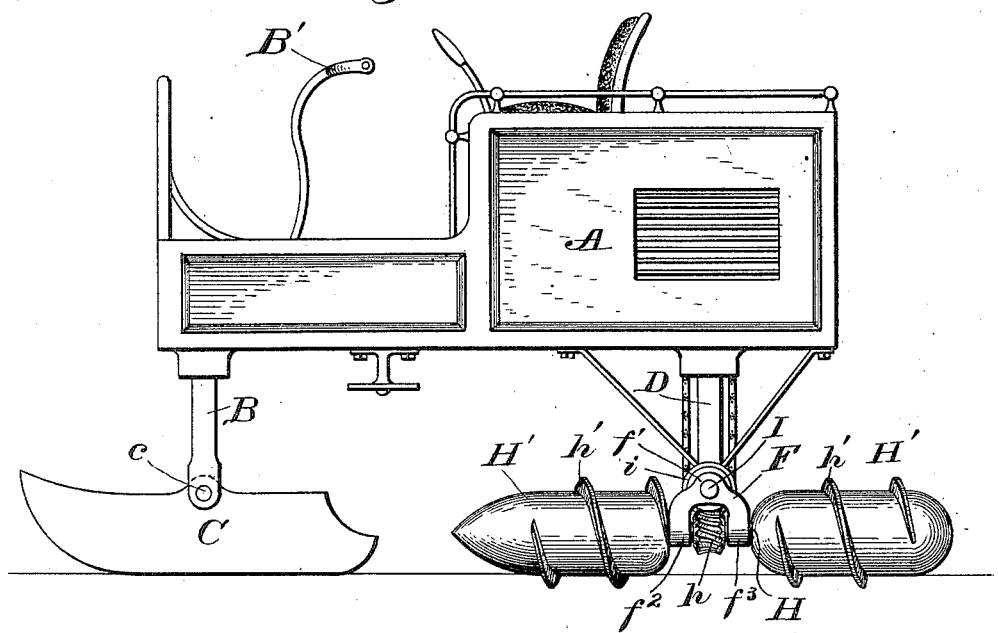
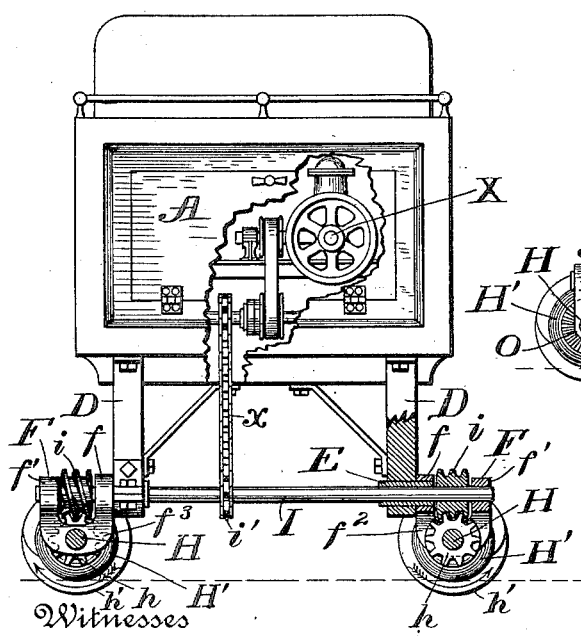
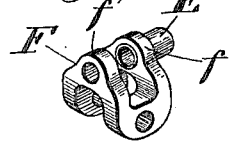
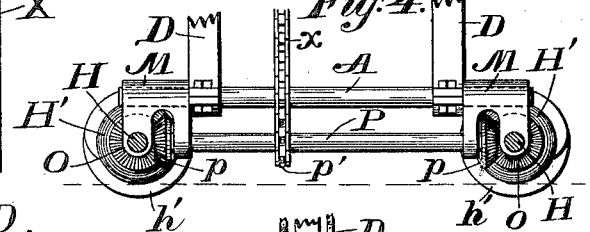
THE NORRIS PETERS CO., PHOTO-LITHO., WASHINGTON, D. C.

UNITED STATES PATENT OFFICE.

JAMES T. SIBLEY AND RICHARD T. NEWTON, OF NEW YORK, N. Y., ASSIGNORS TO W. SCOTT O'CONNOR, OF SAME PLACE.

SLED.

SPECIFICATION forming part of Letters Patent No. 661,427, dated November 6, 1900.

Application filed March 17, 1900. Serial No. 9,084. (No model.)

*To all whom it may concern:*

Be it known that we, JAMES T. SIBLEY and RICHARD T. NEWTON, citizens of the United States, residing at New York, in the county of New York and State of New York, have invented certain new and useful Improvements in Sleds; and we do hereby declare the following to be a full, clear, and exact description of the invention, such as will enable others skilled in the art to which it appertains to make and use the same.

Our invention relates to improvements in runner-vehicles, and especially that class of runner-vehicles in which the motive power is within the said vehicle; and it consists of the several parts constructed and arranged as will be hereinafter fully described and claimed.

Reference is had to the accompanying drawings, in which the same parts are designated by the same letters of reference throughout the several views.

Figure 1 represents a side elevation of a sled embodying our invention. Fig. 2 represents a rear elevation of the same, part of the body being broken away to show the connection of the motor with the driving mechanism, and one of the journal-brackets and the parts connected therewith being shown in section. Fig. 3 is a perspective view of one of the journal-brackets containing the journal-bearings for the two driving-shafts. Fig. 4 is a rear view of a portion of the driving mechanism, showing bevel-gearing in place of the worm-gearing; and Fig. 5 is a side elevation of a portion of the same.

A designates the body of the vehicle, which may be of any suitable form, and is provided under the forward part with standards B, having runners C pivoted to their lower ends, as at $c$. The standards B may be arranged to turn in any suitable manner for the purpose of steering the vehicle and are controlled by a handle B', as usual with vehicles of this class. The rear portion of the vehicle is supported upon the standards D, which are firmly secured to the body of the vehicle at their upper ends and are supported at their lower ends upon the sleeves E, which rest in the journal-brackets F, the said brackets F being supported upon the shaft H of the driving-drums or cylinders H'.

The brackets F, one of which is shown in Fig. 3, each have two upwardly-extending journal-bearings $f f'$, in one of which, $f$, the end of the sleeve E is secured, the other end of which sleeve having a bearing in which it may turn in the lower end of each of the standards D. Thus it will be seen that the driving-drums H', as well as the runners C, have a rocking motion in a vertical plane to allow for inequalities in the surface over which the vehicle may travel. The brackets F are also provided with downwardly-extending journal-bearings $f^2 f^3$, in which the main driving-shafts H are journaled, and between these journal-bearings $f^2 f^3$ are situated worm-wheels $h$, secured to the shafts H and arranged to turn therewith.

A shaft I is journaled in the sleeves E and extends through the said sleeves and into the outer journal-bearings $f'$ and has secured thereto, between the bearings $f$ and $f'$, a worm $i$, meshing with the worm-wheel $h$ on the shaft H.

The shaft I is driven by a sprocket-chain $x$ from any suitable form of motor X, situated in the body of the vehicle, the said chain $x$ passing over a sprocket-wheel $i'$ on the shaft I, the motion of the shaft I being imparted to the main driving-shafts H through the worm-gearing $i$ and $h$.

The sleeves E, which are secured to the brackets F and in which the shaft I is journaled, carry the weight of the standards D and the vehicle supported thereby, thus relieving the shaft I of this weight and the friction consequent thereto. On the shafts H in front of and in rear of the brackets F are secured the driving drums or cylinders H', which are rounded at their ends and provided with spiral flanges $h'$, adapted to sink into the snow and as the drums are revolved to propel the vehicle, as will be readily understood.

In Figs. 4 and 5 is shown a modification in which bevel-gearing is substituted for the worm-gearing shown in Figs. 1 and 2. In this instance the journal-bracket F is replaced by one of slightly different form, as shown at M, and a shaft N extends from one of the brackets M to the other and supports the standards D.

The worm-wheels $h$ are replaced by bevel gear-wheels O, which mesh with bevel gear-wheels $p$ on a shaft P, arranged parallel with the shaft N and journaled in bearings in the journal-brackets M. This shaft P is driven by the sprocket-chain $x$ from the motor, which chain engages a sprocket-wheel $p'$ on the shaft P, as will be readily understood by reference to Figs. 4 and 5 of the drawings.

The vehicle is designed to be used principally on snow, and in operation the driving-drums H′ are revolved, the flanges $h'$ sinking into the snow and propelling the vehicle in the manner of a screw-propeller. The surfaces of the driving-drums between the spiral flanges being smooth will slip easily on the snow and offer very little resistance to the motion either of the drums or the vehicle.

It will be seen that many modifications may be made in the details of construction of this device without departing from the spirit of the invention.

Having thus described our invention, what we claim, and desire to secure by Letters Patent of the United States, is—

1. In a vehicle of the character described, journal-brackets, sleeves attached to the said journal-brackets, bearings in the frame of the said vehicle to receive the said sleeves, drums journaled in the said journal-brackets, and having spiral flanges thereon, a transverse shaft journaled in the said sleeves in the journal-brackets and geared to the said drums, and means for turning the said shaft, substantially as described.

2. In a vehicle of the character described, the combination with journal-brackets; sleeves on the said journal-brackets; journal-bearings in axial line with the said sleeves; a pair of journal-bearings at right angles to the said sleeves; shafts journaled in the last-mentioned journal-bearings; and drums having spiral flanges thereon mounted upon the said shafts; of bearings in the frame of the vehicle to receive the said sleeves; a transverse shaft journaled in the said sleeves and geared to the aforesaid shafts; and means for turning the said transverse shaft; substantially as described.

In testimony whereof we affix our signatures in presence of two witnesses.

JAMES T. SIBLEY.
RICHARD T. NEWTON.

Witnesses:
WM. G. CHITTICK, Jr.,
BAILEY LLOYD.